US012095646B2

(12) United States Patent
Niu et al.

(10) Patent No.: US 12,095,646 B2
(45) Date of Patent: Sep. 17, 2024

(54) MESSAGE SENDING AND RECEIVING METHODS AND APPARATUSES, AND COMMUNICATION SYSTEM

(71) Applicant: HUAWEI TECHNOLOGIES CO., LTD., Guangdong (CN)

(72) Inventors: Chengguang Niu, Beijing (CN); Zhouyi Yu, Beijing (CN); Hongtao Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 220 days.

(21) Appl. No.: 17/555,846

(22) Filed: Dec. 20, 2021

(65) Prior Publication Data
US 2022/0116305 A1 Apr. 14, 2022

Related U.S. Application Data

(63) Continuation of application No. PCT/CN2021/095361, filed on May 23, 2021.

(30) Foreign Application Priority Data

May 30, 2020 (CN) .......................... 202010482871.7
Jun. 28, 2020 (CN) .......................... 202010599684.7

(51) Int. Cl.
*H04L 45/02* (2022.01)
*H04L 45/00* (2022.01)
*H04L 45/12* (2022.01)

(52) U.S. Cl.
CPC .............. *H04L 45/02* (2013.01); *H04L 45/04* (2013.01); *H04L 45/12* (2013.01); *H04L 45/46* (2013.01)

(58) Field of Classification Search
CPC ............. H04L 47/2475; H04L 47/2483; H04L 47/2441; H04L 12/1403; H04L 12/1407;
(Continued)

(56) References Cited

U.S. PATENT DOCUMENTS 11,765,126 B2 * 9/2023 Roy .................... H04L 61/4541
709/245
11,785,668 B2 * 10/2023 Talebi Fard .......... H04W 80/02
370/329
(Continued)

FOREIGN PATENT DOCUMENTS

CN 106993067 A 7/2017
CN 110401972 A 11/2019
(Continued)

OTHER PUBLICATIONS

S. Homma et al., User Plane Protocol and Architectural Analysis on 3GPP 5G System, https://datatracker.ietf.org/doc/draft-ietf-dmm-5g-uplane-analysis/03/, Nov. 4, 2019, 39 pages.
(Continued)

*Primary Examiner* — Jung Liu
(74) *Attorney, Agent, or Firm* — HUAWEI TECHNOLOGIES CO., LTD.

(57) ABSTRACT

This application relates to message sending and receiving methods and apparatuses, and a communication system. A control plane CP device in a communication system in which a CP and a user plane UP are separated generates a first message, where the first message includes route information and a control indication for the route information, and the route information is associated with a UP device. The CP device sends the first message to the UP device, so that the UP device updates the route information based on the control indication, where the first message is a packet forwarding control protocol PFCP message. Based on the technical solutions provided herein, interaction on routing
(Continued)

control between the CP device and the UP device in a communication system architecture in which a CP and a UP are separated may be implemented.

40 Claims, 9 Drawing Sheets

(58) Field of Classification Search
CPC ......... H04L 12/14; H04L 45/74; H04L 69/22; H04L 12/4645; H04L 12/4633; H04M 15/66; H04M 15/8214; H04M 15/00; H04W 76/19; H04W 24/04; H04W 4/24; H04W 76/22; H04W 76/11
See application file for complete search history.

(56) References Cited

U.S. PATENT DOCUMENTS

| | | | | |
|---|---|---|---|---|
| 11,818,603 | B2* | 11/2023 | Park | H04W 76/27 |
| 2020/0059992 | A1 | 2/2020 | Skog et al. | |
| 2020/0245163 | A1* | 7/2020 | Jaya | H04L 47/2475 |
| 2022/0150166 | A1* | 5/2022 | Yang | H04L 45/74 |
| 2022/0386166 | A1* | 12/2022 | Sarker | H04L 69/164 |
| 2023/0328821 | A1* | 10/2023 | Talebi Fard | H04W 76/15 370/329 |
| 2023/0396582 | A1* | 12/2023 | Roy | H04L 61/4541 |

FOREIGN PATENT DOCUMENTS

| | | |
|---|---|---|
| CN | 110996372 A | 4/2020 |
| CN | 111131044 A | 5/2020 |
| WO | 2014060589 A1 | 4/2014 |
| WO | 2018059043 A1 | 4/2018 |

OTHER PUBLICATIONS

TR-459, Control and User Plane Separation for a disaggregated BNG, Issue: 1, Issue Date: Apr. 2020, total 103 pages, XP051882750.
3GPP TS 29.244 V16.3.1 (Apr. 2020), 3rd Generation Partnership Project; Technical Specification Group Core Network and Terminals; Interface between the Control Plane and the User Plane Nodes;Stage 3(Release 16), total 297 pages.
SD-420, SD-420 R3 5G Fixed Mobile Convergence Study, Version: 05, Version Date: Nov. 2018, total 157 bages, XP051563214.
MR-459, Disaggregated BNG, Issue: 1, Issue Date: Oct. 2019, total 10 pages.
TR-459, Control and User Plane Separation for a disaggregated BNG, Issue: 1, Issue Date: Jun. 2020, total 102 bages, XP055938467.
TR-101, Migration to Ethernet-Based Broadband Aggregation, Issue: 2, Issue Date: Jul. 2011, total 101 pages.
TR-384, Cloud Central Office Reference Architectural Framework, Issue: 1, Issue Date: Jan. 2018, total 80 pages.
S. Hu et al., Simple Control and User Plane Separation Protocol (S-CUSP), Internet-Draft, Oct. 19, 2019, https://datatracker.ietf.org/doc/html/draft-chzsimple-cu-separation-bng-protocol-06, 132 pages.

* cited by examiner

| Octet | Bit | | | | | | | |
|---|---|---|---|---|---|---|---|---|
| | 8 | 7 | 6 | 5 | 4 | 3 | 2 | 1 |
| 1 | Version number | | | Idle | Idle | FO | MP | S |
| 2 | A message type | | | | | | | |
| 3 | A message length (bits in a first octet) | | | | | | | |
| 4 | A message length (bits in a second octet) | | | | | | | |
| m to k(m + 7) | If S is set to "1", a session endpoint identifier (SEID) should be set to octets 5–12. If S is not set to "1", there is no SEID field. | | | | | | | |
| n to (n + 2) | SN | | | | | | | |
| (n + 3) | Idle | | | | | | | |

| Octet | Bit | | | | | | | |
|---|---|---|---|---|---|---|---|---|
| | 8 | 7 | 6 | 5 | 4 | 3 | 2 | 1 |
| 1 | Version number | | | Idle | Idle | FO = 0 | MP = 0 | S = 0 |
| 2 | A message type | | | | | | | |
| 3 | A message length (bits in a first octet) | | | | | | | |
| 4 | A message length (bits in a second octet) | | | | | | | |
| 5 | A sequence number (a first decimal bit) | | | | | | | |
| 6 | A sequence number (a second decimal bit) | | | | | | | |
| 7 | A sequence number (a third decimal bit) | | | | | | | |
| 8 | An information element (IE) | | | | | | | |

FIG. 11

| Octet | Bit | | | | | | | |
|---|---|---|---|---|---|---|---|---|
| | 8 | 7 | 6 | 5 | 4 | 3 | 2 | 1 |
| 1 to 2 | Type = NN (decimal) | | | | | | | |
| 3 to 4 | Length = n | | | | | | | |
| 5 to 6 | Enterprise ID = xxx | | | | | | | |
| 7 to 10 | Interface index | | | | | | | |

FIG. 12

| Octet | Bit | | | | | | | |
|---|---|---|---|---|---|---|---|---|
| | 8 | 7 | 6 | 5 | 4 | 3 | 2 | 1 |
| 1 to 2 | Type = XX (decimal) | | | | | | | |
| 3 to 4 | Length = n | | | | | | | |
| 5 to 6 | Enterprise ID = xxx | | | | | | | |
| 7 | Idle | | | | | | V4 | V6 |
| m to (m + 3) | An IPv4 address | | | | | | | |
| p to (p + 15) | An IPv6 address | | | | | | | |

FIG. 13

| Octet | Bit | | | | | | | |
|---|---|---|---|---|---|---|---|---|
| | 8 | 7 | 6 | 5 | 4 | 3 | 2 | 1 |
| 1 to 2 | Type = NN (decimal) | | | | | | | |
| 3 to 4 | Length = n | | | | | | | |
| 5 to 6 | Enterprise ID = xxx | | | | | | | |
| 7 | Idle | | | | Adv | Network | GW | Host |

FIG. 14

| Octet | Bit | | | | | | | |
|---|---|---|---|---|---|---|---|---|
| | 8 | 7 | 6 | 5 | 4 | 3 | 2 | 1 |
| 1 to 2 | Type = NN (decimal) | | | | | | | |
| 3 to 4 | Length = n | | | | | | | |
| 5 to 6 | Enterprise ID = xxx | | | | | | | |
| 7 to 10 | Tag | | | | | | | |

FIG. 15

| Octet | Bit 8 | 7 | 6 | 5 | 4 | 3 | 2 | 1 |
|---|---|---|---|---|---|---|---|---|
| 1 to 2 | Type = NN (decimal) | | | | | | | |
| 3 to 4 | Length = n | | | | | | | |
| 5 to 6 | Enterprise ID = xxx | | | | | | | |
| 7 to 10 | Cost | | | | | | | |

FIG. 16

| Octet | Bit 8 | 7 | 6 | 5 | 4 | 3 | 2 | 1 |
|---|---|---|---|---|---|---|---|---|
| 1 to 2 | Type = 192 (decimal) | | | | | | | |
| 3 to 4 | Length = n | | | | | | | |
| 5 | Idle | | | | | MPL | V4 | V6 |
| m to (m + 3) | An IPv4 address | | | | | | | |
| p to (p + 15) | An IPv6 address | | | | | | | |
| q | A mask/prefix length | | | | | | | |
| k to (n + 4) | These octets exist only when explicitly specified. | | | | | | | |

FIG. 17

| Octet | Bit 8 | 7 | 6 | 5 | 4 | 3 | 2 | 1 |
|---|---|---|---|---|---|---|---|---|
| 1 | Version | | | Idle | Idle | FO | MP | S = 1 |
| 2 | Message type | | | | | | | |
| 3 | A message length (bits in a first octet) | | | | | | | |
| 4 | A message length (bits in a second octet) | | | | | | | |
| 5 | A session endpoint identifier (bits in a first octet) | | | | | | | |
| 6 | A session endpoint identifier (bits in a second octet) | | | | | | | |
| 7 | A session endpoint identifier (bits in a third octet) | | | | | | | |
| 8 | A session endpoint identifier (bits in a fourth octet) | | | | | | | |
| 9 | A session endpoint identifier (bits in a fifth octet) | | | | | | | |
| 10 | A session endpoint identifier (bits in a sixth octet) | | | | | | | |
| 11 | A session endpoint identifier (bits in a seventh octet) | | | | | | | |
| 12 | A session endpoint identifier (bits in an eighth octet) | | | | | | | |
| 13 | A sequence number (bits in a first octet) | | | | | | | |
| 14 | A sequence number (bits in a second octet) | | | | | | | |
| 15 | A sequence number (bits in a third octet) | | | | | | | |
| 16 | A message priority | | | | IE | | | |

FIG. 18

MESSAGE SENDING AND RECEIVING METHODS AND APPARATUSES, AND COMMUNICATION SYSTEM

CROSS-REFERENCE TO RELATED APPLICATIONS

This application is a continuation of International Application No. PCT/CN2021/095361, filed on May 23, 2021, which claims priorities to Chinese Patent Application No. 202010482871.7, filed on May 30, 2020 and Chinese Patent Application No. 202010599684.7, filed on Jun. 28, 2020. All of the aforementioned patent applications are hereby incorporated by reference in their entireties.

TECHNICAL FIELD

This application relates to the communication field, in particular, broadband access technologies, and more specifically, to message sending and receiving methods and apparatuses, and a communication system.

BACKGROUND

Currently, with introduction of broadband network services such as high-speed internet access, video on demand, web TV, and distance education, construction of a broadband access network has become a focus of the industry. In the broadband access network, a broadband network gateway (BNG) is responsible for completing authentication and IP address allocation of a user terminal, and connecting the user terminal to an application service provider (ASP) or a network service provider (NSP) network by using an IP core. To facilitate maintenance of the BNG, a virtual broadband network gateway (vBNG) architecture has been provided. In the vBNG architecture, BNG functions are divided into a control plane function (CPF) and a user plane function (UPF). In addition, the vBNG architecture separates the CPF from a physical BNG (also briefly referred to as CU separation hereinafter) and deploys the CPF in a data center. Correspondingly, the UPF is retained in the physical BNG and is deployed in its original location.

In the foregoing vBNG architecture with CU separation, a vBNG function needs to be implemented through interaction between a CP and a UP. For example, routing control is a basic function of the vBNG, used for data flow forwarding of data services and interacting with a core router over a routing protocol to advertise a route.

SUMMARY

Embodiments of the present disclosure provide a routing control solution, to implement interaction between a CP and a UP on routing control.

According to a first aspect of the embodiments of the present disclosure, a message sending method is provided. The method is applied to a CP device in a communication system with CU separation, and the communication system further includes a UP device. The method includes: The CP device generates a first message, where the first message includes route information and a control indication for the route information, and the route information is associated with the UP device; and the CP device sends the first message to the UP device, so that the UP device updates the route information based on the control indication, where the first message is a packet forwarding control protocol (PFCP) message. This may implement a route delivery operation in the communication system with CU separation.

In a possible implementation, the first message is a node-level message or a session-level message. In this manner, the first message can be adapted to the PFCP protocol. This facilitates deployment of a communication system with CU separation.

In a possible implementation, the route information is a grouped information element in the node-level message or the session-level message. The route information may be delivered by using the node-level message or the session-level message.

In a possible implementation, the control indication includes at least one of an install indication and a remove indication, the install indication is used to indicate to install the route information, and the remove indication is used to indicate to remove the route information. In this manner, a control operation on the route information may be explicitly indicated.

In a possible implementation, the route information includes a destination address and a next-hop address. In a possible implementation, the route information further includes at least one of the following: an outbound interface index, a route flag, a route tag, a route cost, and a network instance. The outbound interface index is used to indicate path information associated with the route information. The route flag is used to indicate a type of the route information, and the type of the route information includes at least one of the following: a network segment route, a gateway route, a host route, or a frame route. The route tag is used to indicate an identifier of the route information, and the route tag corresponds to a route tag in a border gateway protocol. The route cost is used to indicate a cost of a route associated with the route information. The network instance is used to identify a virtual private network, and the network instance corresponds to a network instance in the PFCP protocol. In this manner, the route information can be accurately described.

In a possible implementation, the at least one of the outbound interface index, the route flag, the route tag, and the network instance is an embedded information element in the route information. In this manner, description information of the route information can be transferred.

In a possible implementation, the route information includes indication information, and the indication information is used to indicate the UP device to advertise the route information. In this manner, an advertising operation of the route information can be implemented.

In a possible implementation, the first message further includes first type information, and the first type information indicates that the first message includes the control indication. This manner helps the UP device determine a type of the first message, and improve processing efficiency.

In a possible implementation, the first type information is a message type (message type) field in the first message.

In a possible implementation, the route information includes first route information and second route information. A plurality of pieces of route information can be delivered in a same message, to enhance effectiveness of route delivery.

In a possible implementation, the control indication includes a first control indication for the first route information and a second control indication for the second route information. The first control indication is used to indicate to install or remove the first route information, and the second control indication is used to indicate to install or remove the second route information. In this manner, both installing and removing of the route information can be controlled. This improves effectiveness of routing control.

In a possible implementation, the method further includes: The CP device receives a second message from the UP device, where the second message includes a response of the UP device to the first message. In this manner, the CP device can conveniently learn a sending status of the first message. This facilitates implementation of a routing control operation.

In a possible implementation, the second message is a node-level message or a session-level message. In this manner, the second message can be adapted to the first message. This facilitates message processing.

In a possible implementation, the second message further includes identification information of the UP device. In this manner, a source of the second message can be conveniently learned. This facilitates processing by the CP device.

In a possible implementation, the second message further includes second type information, and the second type information indicates that the second message includes the response. The CP device may conveniently determine a type of the second message based on the second type information. This facilitates receiving and processing of the second message.

In a possible implementation, the session-level message includes one of the following: a session establishment request message, a session deletion request message, and a session modification request message. In this manner, an existing message may be reused. This saves communication resources.

According to a second aspect of the embodiments of the present disclosure, a message receiving method is provided. The method is applied to a UP device in a communication system with CU separation, and the communication system further includes a CP device. The method includes: The UP device receives a first message from the CP device, where the first message includes route information and a control indication for the route information, and the route information is associated with the UP device; and the UP device updates the route information based on the control indication, where the first message is a PFCP message. In this manner, a route update operation can be implemented in the communication system with CU separation.

In a possible implementation, the first message includes first type information, the first type information indicates that the first message includes the control indication, and the receiving a first message includes: The UP device obtains the control indication from the first message based on the first type information. This manner facilitates receiving and processing of the first message by the UP device.

In a possible implementation, updating the route information includes at least one of the following: The UP device installs the route information based on the control indication; and the UP device removes the route information based on the control indication. In this manner, installing and removing of the route information can be implemented.

In a possible implementation, the route information includes indication information, the indication information indicates the UP device to advertise the route information, and the method further includes: The UP device advertises the route information based on the indication information. In this manner, the route information can be delivered.

In a possible implementation, the method further includes: The UP device generates a second message, where the second message includes a response to the first message; and the UP device sends the second message to the CP device. In this manner, the CP device may be notified of a receiving status of the first message. This facilitates implementation of a routing control operation.

In a possible implementation, the second message further includes second type information, and the second type information indicates that the second message includes the response. In this manner, the CP device may be notified of a type of the second message. This facilitates receiving and processing of the second message by the CP device.

According to a third aspect of the embodiments of the present disclosure, a CP device is provided. The CP device includes at least one processor, and at least one memory that stores computer program code, where the at least one memory and the computer program code are configured to work with the at least one processor to enable the CP device to perform the method according to any one of the first aspect or the possible implementations of the first aspect. In this manner, a device that can implement a route delivery operation in a communication system with CU separation may be provided.

According to a fourth aspect of the embodiments of the present disclosure, a UP device is provided. The UP device includes at least one processor, and at least one memory that stores computer program code, where the at least one memory and the computer program code are configured to work with the at least one processor to enable the UP device to perform the method according to any one of the second aspect or the possible implementations of the second aspect. In this manner, a device that can implement a route updating operation in a communication system with CU separation may be provided.

According to a fifth aspect of the embodiments of the present disclosure, a message sending apparatus is provided, to perform the method according to any one of the first aspect or the possible implementations of the first aspect. Specifically, the apparatus includes units configured to perform the method in any one of the first aspect or the possible implementations of the first aspect.

According to a sixth aspect of the embodiments of the present disclosure, a message receiving apparatus is provided, to perform the method according to any one of the second aspect or the possible implementations of the second aspect. Specifically, the network device includes units configured to perform the method in any one of the second aspect or the possible implementations of the second aspect.

According to a seventh aspect of the embodiments of the present disclosure, a communication system is provided. The communication system includes the device provided in the third aspect or the fourth aspect, or the device provided in the fifth aspect or the sixth aspect.

According to an eighth aspect of the embodiments of the present disclosure, a chip is provided, including a memory and a processor. The memory is configured to store a computer program, and the processor is configured to invoke and run the computer program in the memory, to perform the method according to any one of the first aspect and the possible implementations of the first aspect; or the processor performs the method according to any one of the second aspect or the possible implementations of the second aspect.

According to a ninth aspect of the embodiments of the present disclosure, a computer-readable storage medium is provided. The computer-readable storage medium includes machine-executable instructions, and when the machine-executable instructions are executed by a device, the device is enabled to perform the method according to any one of the first aspect and the possible implementations of the first aspect; or the device is enabled to perform the method according to any one of the second aspect or the possible implementations of the second aspect. In this manner, a computer-readable storage medium that can perform a route delivery function or a route updating function may be provided.

According to a tenth aspect of the embodiments of the present disclosure, a computer program product is provided. The computer program product includes computer program code, and when the computer program code is executed by a device, the device is enabled to perform the method according to any one of the first aspect and the possible implementations of the first aspect; or the device is enabled to perform the method according to any one of the second aspect or the possible implementations of the second aspect. In this manner, a computer program product that can execute a route delivery function or a route updating function may be provided.

It may be understood from the following description of example embodiments that, according to the technical solutions provided herein, interaction on routing control between a CP and a UP in a communication system architecture with CU separation may be implemented. In addition, compatibility with existing protocols can be implemented. This facilitates deployment of the communication system architecture with CU separation.

It should be understood that content described in the summary is not intended to limit a key or important feature of the embodiments of the present disclosure, nor is it intended to limit the scope of the present disclosure. Other features of the present disclosure are readily understood in the following description.

BRIEF DESCRIPTION OF DRAWINGS

The foregoing and other features, advantages, and aspects of embodiments of the present disclosure will become more apparent in conjunction with the accompanying drawings and with reference to the following detailed description. In the accompanying drawings, same or similar reference numerals denote same or similar elements.

FIG. 11 shows an example of a header of a node-level message.

FIG. 12 shows an example of an if-index embedded IE.

FIG. 13 shows an example of a next-hop embedded IE.

FIG. 14 shows an example of a route-flag embedded IE.

FIG. 15 shows an example of a tag embedded IE.

FIG. 16 shows an example of a cost embedded IE.

FIG. 17 shows an example of a source IP address embedded IE.

FIG. 18 shows an example of a header of a session-level message.

DESCRIPTION OF EMBODIMENTS

Figure 1:
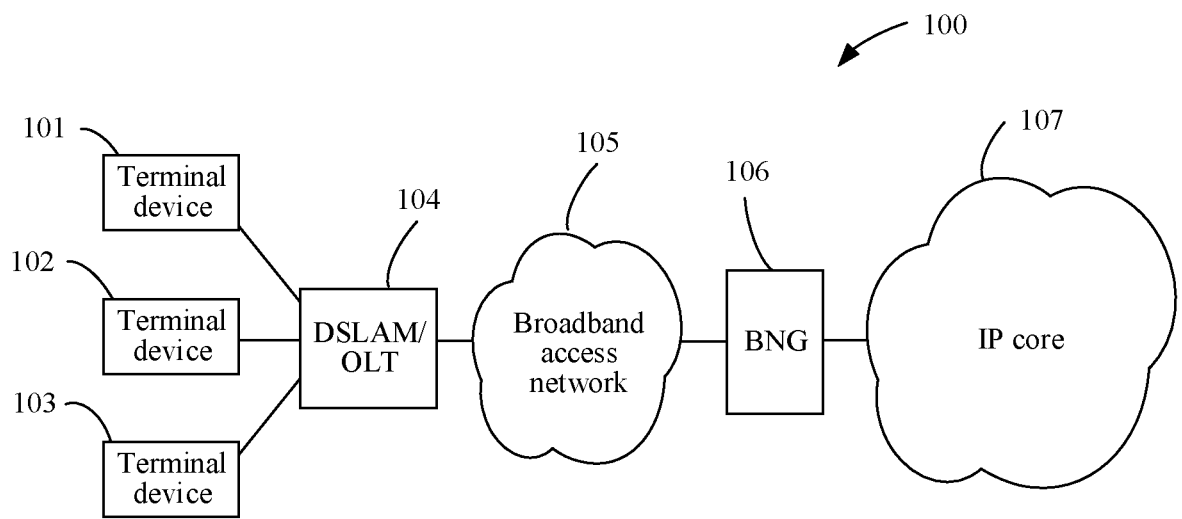
FIG. 1 shows a schematic diagram of an example broadband network system in which an embodiment of the present disclosure may be implemented.

Embodiments of the present disclosure will be described in more detail below with reference to the accompanying drawings. Although some embodiments of the present disclosure are shown in the accompanying drawings, it should be understood that the present disclosure may be implemented in various manners and should not be construed as limited to the embodiments described herein. However, these embodiments are provided for a more thorough and complete understanding of the present disclosure. It should be understood that the accompanying drawings and the embodiments of the present disclosure are merely used as an example, but are not intended to limit the protection scope of the present disclosure.

As used herein, the term "includes" and variations thereof are open inclusive, that is, "including but not limited to". The term "based on" means "at least partially based on". The term "an embodiment" means "at least one embodiment"; and the term "another embodiment" means "at least one further embodiment". Related definitions of other terms are provided in the description below.

It should be understood that although the terms "first" and "second" and the like may be used herein to describe various elements, these elements should not be limited by these terms. These terms are used only to distinguish one element from another. For example, a first element may be referred to as a second element, and likewise a second element may be referred to as a first element without departing from the scope of the embodiments. As used herein, the term "and/or" includes any and all combinations of one or more of provided terms.

As used herein, the term "circuit" refers to one or more of the following:

(a) a hardware circuit implementation only (for example, implementations of analog and/or digital circuits only);

(b) a combination of a hardware circuit and software (if applicable), for example: (i) a combination of an analog and/or digital hardware circuit and software/firmware, and (ii) any part of a hardware processor and software (including a digital signal processor, software and a memory that works together and that enables an apparatus, for example, an optical line terminal (OLT) or another computing device to perform various functions); and (c) a hardware circuit and/or a processor, for example, a microprocessor or a part of a microprocessor, which requires software (for example, firmware) for operation, but there may be no software when the software is not required for operation.

A definition of the circuit is applicable to all use scenarios of the term in this application (including any one of the claims). In another example, the term "circuit" as used herein also covers implementations of only a hardware circuit or a processor (or a plurality of processors), a part of a hardware circuit or a processor, or accompanying software or firmware thereof. For example, if applicable to a particular claim element, the term "circuit" also covers a baseband integrated circuit, a processor integrated circuit, an OLT, or a similar integrated circuit in another computing device.

As used herein, the term "terminal device" refers to any device having wireless or wired communication capabilities. An example of the terminal device includes, but is limited to, customer-premises equipment (CPE), user equipment (UE), a personal computer, a desktop computer, a mobile phone, a cellular phone, a smartphone, a personal digital assistant (PDA), a portable computer, a tablet computer, a wearable device, and an internet of things (IoT) device, a machine type communication (MTC) device, a vehicle-mounted device for V2X (X means a pedestrian, a vehicle or an infrastructure/network) communication, an image capture device, for example, a digital camera, a gaming device, a music storage and playback device, or an internet device capable of wireless or wired internet access and browsing, and the like.

As used herein, the term "broadband network system" may be a wired broadband network system or a wireless broadband network system. In this specification, the term "IP core" refers to an "IP-based core network" and may also be referred to as a "regional broadband network". The term "broadband access network" may be a wired broadband access network or a wireless broadband access network. The term "broadband access" may be wired broadband access or wireless broadband access. For example, a manner of broadband access may be an asymmetric digital subscriber line (ADSL), a cable modem, a digital subscriber line (DSL), a high-speed digital subscriber line (VDSL), an Ethernet, a fiber-to-the-home (FTTH), a local area network (LAN), and/or a passive optical network (PON), or the like. With rapid development of the broadband network technologies, there are certainly future types of broadband network technologies and systems, and the present invention may be combined with them. It should not be construed as limiting the scope of the present disclosure to the systems described above.

A BNG is used to connect user equipment to a broadband network, and is a key device in the network. Refer to FIG. 1. FIG. 1 is an example of a location of a BNG in a network. FIG. 1 shows a schematic diagram of an example broadband network system 100 in which an embodiment of the present disclosure may be implemented. As shown in FIG. 1, the system 100 includes terminal devices 101, 102, and 103, a digital subscriber line access multiplexer/optical line terminal (DSLAM/OLT) 104, a broadband access network 105, a BNG 106, and an IP core 107. The broadband access network 105 may include an Ethernet aggregation point, a switch, and the like. The IP core 107 may be connected to an ASP or NSP network. For example, the IP core 107 may be connected to a remote user dial-up authentication service (Radius) server, a dynamic host configuration protocol (DHCP) server, an interactive personality television (IPTV) server, a next-generation network (NGN) server, and the like. It should be understood that quantities of terminal devices, DSLAM/OLTs, broadband access networks, BNGs, and IP cores are not limited to the example shown in FIG. 1, but may include any other appropriate quantities. Moreover, the server to which the IP core 107 may be connected is not limited to the foregoing example, but the IP core 107 may be connected to any appropriate server known in the art or developed in the future. In addition, the system 100 may include more additional components not shown or may not include some shown components, which is not limited in this embodiment of the present disclosure. Implementation of the system 100 is also not limited to the specific example described above, but may be implemented in any appropriate manner.

For ease of description, the following uses the terminal device 101 as an example for description. For example, when the terminal device 101 needs to access a network, the terminal device 101 may send an access request to the BNG 106 by using the DSLAM/OLT 104 and the access network 105, and the BNG 106 authenticates and allocates an address to the terminal device 101 based on the access request. For example, the BNG 106 may act as a RADIUS client to interact with a RADIUS server in the IP core 107, to complete authentication of the terminal device 101. Then, the BNG 106 may allocate an address to the terminal device 101, and may generate a forwarding table to control data flow forwarding of the terminal device 101. In the broadband network system 100, a downstream flow from the IP core 107 to the terminal device 101 needs to be controlled by using a route.

Figure 2:
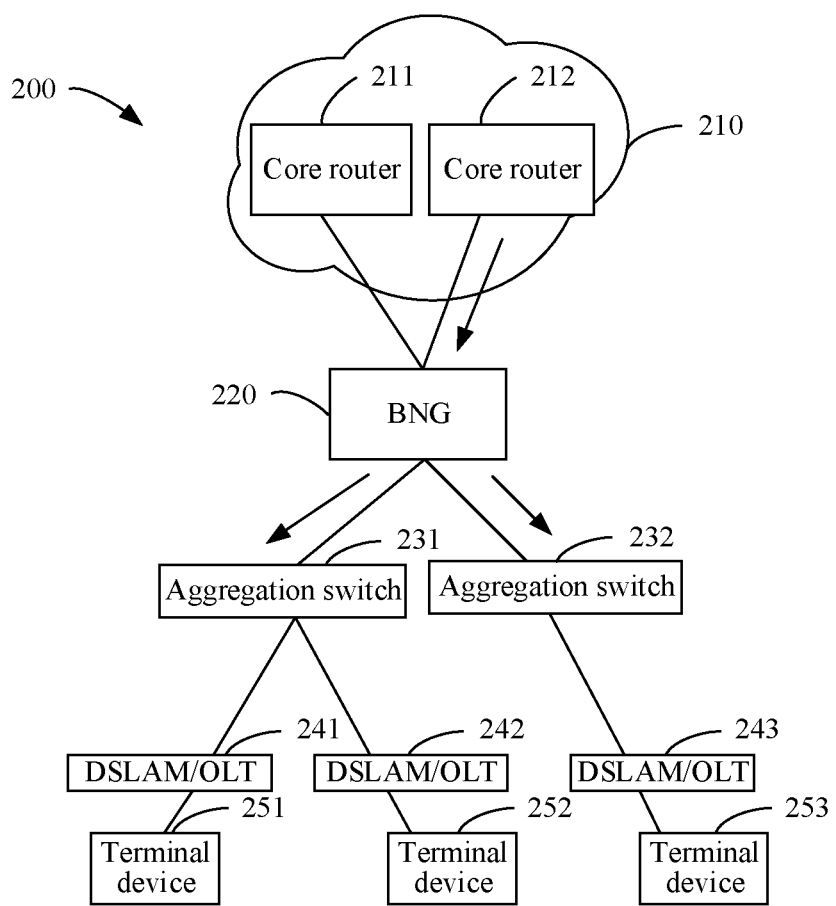
FIG. 2 shows a schematic diagram of a routing control process of a conventional BNG.

The following describes a routing control method with reference to FIG. 2. FIG. 2 shows a schematic diagram of a routing control process 200 of a BNG. As shown in FIG. 2, a BNG 220 may have a capability of a DHCP server, to allocate IP addresses to terminal devices 251, 252, and 253. In addition, the BNG 220 can manage route information corresponding to these IP addresses. For example, when a downstream flow from a core router 211 or 212 of an IP core 210 arrives at the BNG 220, the BNG 220 may forward the downstream flow to a corresponding aggregation switch 231 or 232 based on a network segment route associated with a destination address of the downstream flow, and the downstream flow is sent to the corresponding terminal device 251, 252, or 253 by using a corresponding DSLAM/OLT 241, 242, or 243.

In addition, the BNG 220 is responsible for advertising the managed route information to the IP core 210. In other words, the BNG 220 sends the managed route information to the core routers 211 and 212. Generally, routes may be classified into a network segment route, a gateway route, a host route, and a frame route. The network segment route needs to be advertised to the IP core 210. The gateway route is used to identify the BNG 220 itself. The host route is used to control forwarding traffic to the terminal devices 251, 252, and 253. The frame route may be an IP address of a private-line subscriber, or may be a route of a subnet managed by the private-line subscriber, which both need to be advertised to the IP core 210, and forwarding traffic to the terminal devices 251, 252, and 253 needs to be controlled.

As mentioned above, to facilitate maintenance of the BNG, a vBNG architecture with CU separation has been provided. In deployment of the vBNG architecture, three types of interfaces are defined between a CP and a UP. One type is a management interface (Mi), which uses the network configuration protocol Netconf/yang. Another type is a control packet redirection interface (CPRi), which completes forwarding of a protocol packet between a terminal device (for example, a CPE) and a vBNG CP. Another type is a status control interface (SCi), which uses a PFCP defined in 3GPP TS 29.244. The SCi is used by the UP to report node information to the CP. After completing terminal access, the CP delivers a forwarding control action to the UP for execution, and the UP completes and reports statistics to the CP.

The CP may allocate one or more IP address blocks to the UP. Each address block includes a set of IP addresses. These IP addresses are allocated to a client that is to dial up to the UP. To ensure that other nodes in the IP core learn how to reach these IP addresses, the CP needs to install one or more pieces of route information on the UP and notify the UP to advertise the route information to the IP core.

The embodiments of the present disclosure provide a routing control solution. According to the technical solution provided herein, a message used for routing control is transmitted between the CP and the UP. This completes a routing control function. Specifically, the SCi may be extended (that is, the PFCP protocol is extended), so that a message applicable to the SCi is generated for routing control and the message is communicated between the CP and the UP over the SCi. In this manner, interaction on routing control between the CP and the UP in a communication system architecture with CU separation can be implemented. For ease of understanding, the following describes this in detail with reference to FIG. 3 and FIG. 4.

Figure 3:
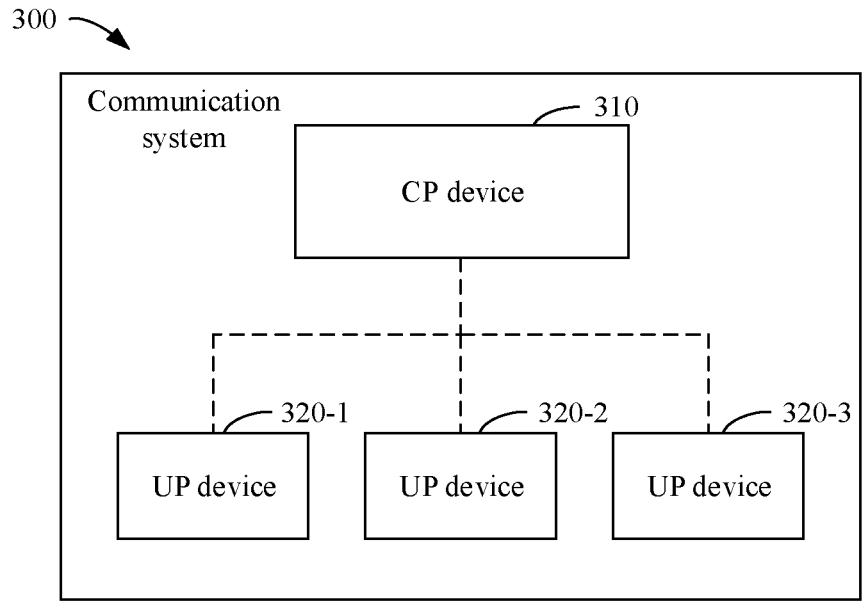
FIG. 3 shows a schematic diagram of a communication system with CU separation in which an embodiment of the present disclosure may be implemented.

FIG. 3 shows a schematic diagram of a communication system 300 with CU separation in which an embodiment of the present disclosure may be implemented. The communication system 300 includes a CP device 310 that executes a CPF and UP devices 320-1, 320-2, and 320-3 that execute a UPF (for ease of description, the UP devices may also be collectively referred to as a UP device 320 below). The CP device 310 is physically separate from each of the UP devices 320-1, 320-2, and 320-3. The UP devices 320-1, 320-2 and 320-3 are also physically separate. For example, the CP device 310 may be deployed in a remote data center, and the UP devices 320-1, 320-2, and 320-3 may be deployed locally. One CP device 310 may be used to control a plurality of UP devices 320-1, 320-2, and 320-3. In this manner, CP functions corresponding to the UP devices 320-1, 320-2, and 320-3 may be centralized. This further facilitates maintenance, and reduces maintenance costs. It should be understood that a quantity of CP devices is not limited to one, but may be more. A quantity of UP devices is not limited to the foregoing example, but may be more or fewer.

As shown in FIG. 3, the CP device 310 may interact with any UP device of the UP devices 320-1, 320-2, and 320-3, to implement a function of a conventional BNG. For example, the CP device 310 may provide functions such as authentication, authorization, and accounting (AAA), access management, session management, address allocation, and service policy control. Each UP device of the UP devices 320-1, 320-2, and 320-3 may implement a forwarding processing function for a managed terminal device. The forwarding processing function may include: sending an access protocol packet to a CP, forwarding, to a terminal device, a control packet sent by the CP to the terminal device, performing a binding check on an uplink data packet of the terminal device (for example, after authentication succeeds, a corresponding binding table is generated on the UP) and forwarding the uplink data packet to an IP core, quality of service (QoS) processing, statistics collection, and the like. It should be understood that the communication system 300 is not limited to a BNG function, but may be configured to implement any other appropriate function other than the BNG.

Figure 4:
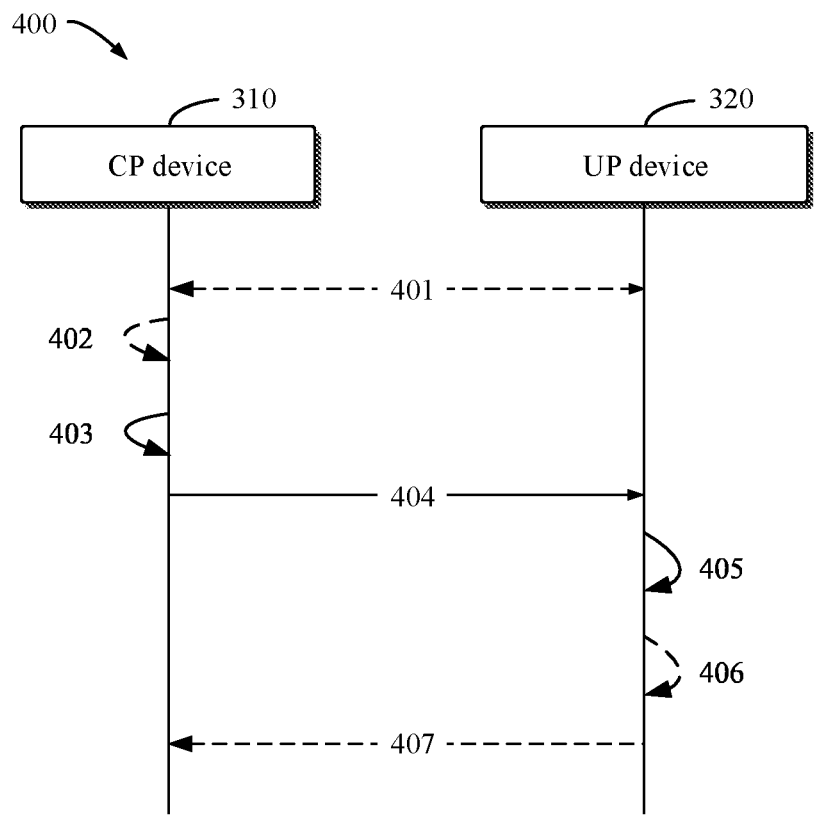
FIG. 4 shows a schematic diagram of a routing control process according to an embodiment of the present disclosure.

FIG. 4 shows a schematic diagram of a routing control process 400 according to an embodiment of the present disclosure. For ease of description, FIG. 4 is described below with reference to an example in FIG. 3. It should be understood that a process in FIG. 4 may include other additional processes that are not shown, or may not include some shown processes. The scope of the present disclosure is not limited thereto.

As shown in FIG. 4, the CP device 310 may establish an association with the UP device 320, that is, step 401 in FIG. 4. For example, the CP device 310 may initiate a handshake with the UP device 320, to establish the association by using an association setup request/response message and a heartbeat request/response message. After establishing the association, the CP device 310 may allocate an address to the UP device 320 and generate a related route, that is, step 402 in FIG. 4. In this embodiment of the present disclosure, the CP device 310 may allocate a set of one or more addresses to the UP device 320. Corresponding route information is generated for each address in the set. In some embodiments, the route information may be for a network segment route. In some alternative embodiments, the route information may be for a gateway route. In still some alternative embodiments, the route information may be for a host route. In addition, the route information may be for a frame route or another appropriate route.

For the generated route information, the CP device 310 generates a route delivery request message (also referred to as a first message hereinafter for ease of description), that is, step 403 in FIG. 4, so that the first message includes a control indication for the route information. In some embodiments of the present disclosure, the control indication may include an install indication for the route information. In this manner, an installing operation of the route information can be implemented. In some embodiments, the control indication may include a plurality of install indications, where each install indication is for different route information. In alternative or additional embodiments of the present disclosure, the control indication may include a remove indication for the route information. In this manner, a removing operation of the route information can be implemented. In some embodiments, the control indication may include a plurality of remove indications, where each remove indication is for different route information. In some embodiments, the control indication may include an install indication, and may also include a remove indication. In these embodiments, the control indication may further include identification information of the CP device 310. Therefore, the UP device 320 may correctly receive the first message from the CP device 310 that establishes the association with the UP device 320.

In some embodiments, the route information may include a destination address and a next-hop address. In some additional embodiments, the route information may further include an outbound interface index (Out-If-info). The outbound interface index is used to indicate path information associated with the route information. For example, path information required for forwarding a packet associated with the route information. In some embodiments, the route information may further include a route flag. The route flag may also be referred to as a route-related identifier, and is used to indicate a type of the route information. The type of the route information may include at least one of a network segment route, a gateway route, a host route, and a frame route. The type of the route information is not limited thereto, but may include any appropriate type known in the art or developed in the future.

In some embodiments, the route information may further include a route tag. The route tag may correspond to a route tag in a border gateway protocol (BGP), and is used to indicate an identifier of the route information. The route tag is advertised to a core router. This facilitates the core router to implement route filtering. For example, some forwarding policies may be set based on the route tag, such as specifying and selecting a tag path, and setting a feature forwarding priority.

In some embodiments, the route information may further include a route cost. The route cost is advertised to the core router, so that the core router performs routing when calculating a route. In addition, the route information may further include a network instance. The network instance corresponds to a network instance in the PFCP protocol, and is used to identify a virtual private network (VPN), for example, a layer 3 VPN (L3VPN).

In some additional or alternative embodiments, the route information may include indication information used to indicate the UP device to advertise the route information. In this manner, the route information may be advertised to the core router, so that the core router can advertise the route information to another gateway or router. For example, if the indication information is a preset value, it indicates that the UP device needs to advertise the route information. In some alternative embodiments, the indication information may also be implicitly determined by using a route identifier in the route flag. For example, if the route flag indicates that the route information is the network segment route or the frame route, it indicates that the route information needs to be advertised. If the route flag indicates that the route information is the gateway route or the host route, it indicates that the route information does not need to be advertised. The indication information may also be indicated in another manner, which is not limited to the example herein.

In some embodiments, the first message may be a node-level message. In an alternative embodiment, the first message may alternatively be a session-level message. In some embodiments, the CP device 310 may use a same type of message for different types of routes. For example, the node-level message may be used for the network segment route, the gateway route, the host route, and the frame route. The session-level message may also be used. In some alternative embodiments, the CP device 310 may use different types of messages for different types of routes. For example, the node-level message may be used for the network segment route and the gateway route. The session-level message may be used for the host route and the frame route. The foregoing is merely an example, and another appropriate message type known in the art or developed in the future may also be used in the embodiments of the present disclosure. In some embodiments of the present disclosure, the route information may be a grouped information element (Grouped IE) in the node-level message or the session-level message.

Figures 9, 10:
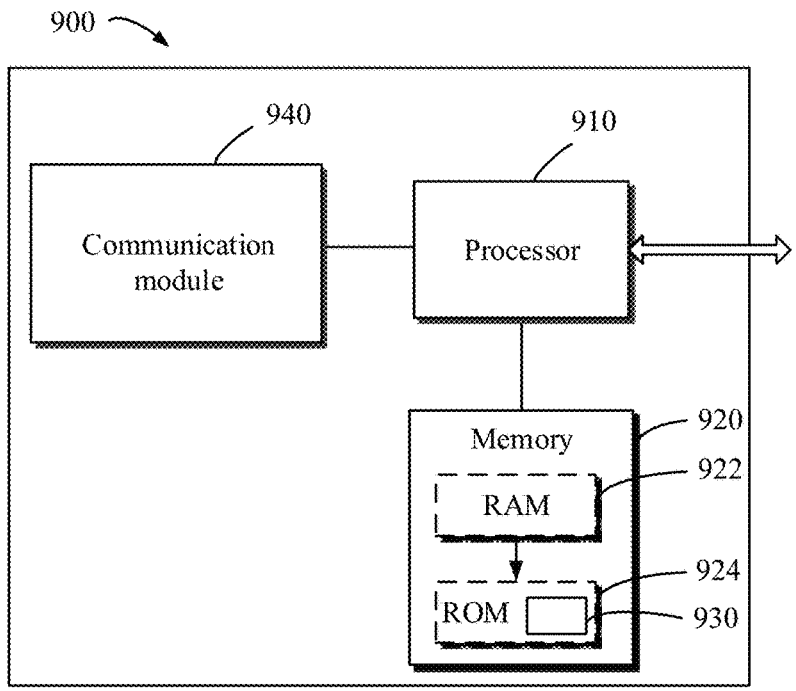
FIG. 9 shows a simplified block diagram of an apparatus applicable to implementing an embodiment of the present disclosure.
FIG. 10 shows general format of a message in the PFCP protocol.

For ease of understanding, the following provides more detailed description with reference to an example message format. FIG. 10 shows definitions of a message format in the PFCP protocol.

Meanings of fields are shown in Table 2.

TABLE 2

| | Meanings of fields in FIG. 10 |
|---|---|
| S | A value is 1 indicates that a packet includes an SEID field |
| SEID | A session endpoint identifier, whose length is 8 octets, used to uniquely identify session information controlled by the SEID. |
| MP | A priority of a message<br>If a value is 1, the priority is stored from a fifth bit to an eighth bitoctet of a 16th octetoctet.<br>When a system is overloaded, this parameter may be carried in a message, and a receiver preferably processes a high-priority message and discards a low-priority message. |
| FO | If a packet carries a plurality of messages, an FO of a last message header is 0, and an FO of a previous message header is 1. |
| A sequence number | 3 octets<br>If S = 0, a value of the sequence number is moved forward to start from a fifth octet. |
| Version number | 3 bits. A current version number is 1, and binary is 001B. |
| Idle | A reserved field, which is padded to be four octets and needs to be set to 0. |
| Message type | A type of a message |
| Message length | A length of a message, in a decimal format. The message length does not include a fixed 4-octet part of a header. The length includes an SEID that follows, a sequence number part, and an IE that follows. |

In some embodiments, the first message may include message type information (also referred to as first type information hereinafter for ease of description), used to indicate that the first message includes the control indication. In other words, the first type information may indicate that the first message is a route delivery request. In some embodiments, the first type information may be any appropriate message type value. For example, the message type value may be any appropriate decimal value. The following describes an example in which the first message is the node-level message in detail. FIG. 11 shows an example header of a node-level message. For meanings of fields, refer to Table 2. Details are not described herein again. FO, MP, and S fields are all 0. An idle field is required to be set to 0 by a sender, and a receiver does not check the field. A sequence number corresponds to a transaction. A message type may be any appropriate value used to indicate the route delivery request. In some embodiments, a message type field of the first message may be any value between 16 and 49. For example, as shown in Table 4, the message type field of the first message may be 18. It should be understood that this is merely an example, and a message type value and a name of the first message are not limited thereto, but may be any appropriate value and name.

TABLE 4

Example of an extended route delivery request message

| Message type value (decimal) | Message |
| --- | --- |
| 18 | PFCP route install request (PFCP route install request) |

The IE field in FIG. 11 may be understood as an attribute having a tag-length-value (TLV) encapsulation format. Different IEs may have an embedding relationship. Based on different embedding manners, IEs are classified into a grouped IE and an embedded IE. The embedded IE is an attribute at a smallest unit. One grouped IE may include a plurality of embedded IEs. In this embodiment of the present disclosure, the route information and the control indication for the route information may be included in the IE field. Table 5 shows an example of an IE carried in the first message.

TABLE 5

Example of an IE carried in the first message

| IE name | P | Condition/Description | IE type |
| --- | --- | --- | --- |
| Node ID | M | A device number of a CP | Node ID |
| Install route | C | An install route. A plurality of install route IEs may be carried. | Install route |
| Remove route | C | A remove route. A plurality of remove route IEs may be carried. | Remove route |

Meanings of the item P are shown in Table 6.

TABLE 6

Meanings of the item P in FIG. 11

| Type of whether an IE appears in a service process | Description |
| --- | --- |
| Mandatory (M) | A required item |
| Conditional (C) | An IE is carried when a condition is met. |
| Conditional-optional (CO) | Whether an IE is carried may be chosen when a condition is met. |
| Optional (O) | Whether an IE is carried may be chosen. |

It should be understood that implementation of the present disclosure is not limited to the example of FIG. 11, but may be implemented in any other appropriate manner.

A grouped IE may be embedded in the IE field in FIG. 11. The following Table 7 shows an example of an install route grouped IE.

TABLE 7

Example of an install route grouped IE

| Octets 1 and 2 | Install route IE type = XX (decimal) |
| --- | --- |
| Octets 3 and 4 | Length = n |
| Octets 5 and 6 | Enterprise ID = xxx |

| IE name | P | Condition/Description | IE type |
| --- | --- | --- | --- |
| Destination IP address | M | A destination address of a route, including a mask. | A source IP address (that of an existing IE is reused), including an IP and a mask, expressed as IPv4/IPv6. A maximum length of an IPv6 mask is 128 bits. |
| Out-if-info | O | An outbound interface index, which needs to be reported to a CP by a UP. | If-index |
| Next-hop | M | A next-hop address | Next-hop |
| Route-flag | O | An identifier related to a route | Route-flag |
| Route-tag | C | A tag of a route, which is advertised to another route over a BGP, so that route filtering of the another route can be implemented. | Tag |

TABLE 7-continued

Example of an install route grouped IE

| | | | |
|---|---|---|---|
| Route-cost | C | A cost of a route, which is advertised to another route over an IGP/BGP, so that routing of the another route can be implemented. | Cost |
| Network Instance | C | A VPN instance to which a route belongs. If the route is on a public network, this attribute does not need to be carried. | Network instance (that of an existing IE is reused) |

The following Table 8 shows an example of a remove route grouped IE.

TABLE 8

Example of a remove route grouped IE

Octets 1 and 2    Remove route IE type = XX (decimal)
Octets 3 and 4    Length = n
Octets 5 and 6    Enterprise ID = xxx

| IE name | P | Condition/Description | IE type |
|---|---|---|---|
| Destination IP address | M | A destination address of a route, including a mask. | A source IP address (that of an existing IE is reused), including an IP and a mask, expressed as IPv4/IPv6. |
| Next-hop | M | A next-hop address. A route to the same destination has a plurality of next-hop paths. When the route is removed, next-hop information needs to be carried, to identify a path to be removed. | Next-hop |
| Network Instance | C | A VPN instance to which a route belongs. If the route is on a public network, this attribute does not need to be carried. | Network instance (that of an existing IE is reused) |

It can be learned from Table 7 and Table 8 that an embedded IE may be embedded in a grouped IE. For example, an IE whose type is if-index in Table 7 may be an embedded IE shown in FIG. 12.

The interface index field may be encoded as a 32-bit unsigned integer. Fields of the type, length, and enterprise ID are two octets in decimal format.

For another example, an IE whose type is next-hop in Table 7 or Table 8 may also be an embedded IE shown in FIG. 13.

The fifth octet is a flag field. For example:

The bit 1 V6: If a value of V6 is 1, it indicates that an IPv6 next-hop address is carried.

The bit 2 V4: If a value of V4 is 1, it indicates that an IPv4 next-hop address is carried.

The bits 3 to 8: reserved fields.

Only one of the bits V4 and V6 is set to 1.

The octets "m to (m+3)" and "p to (p+15)" indicate the IPv4 address or the IPv6 address, for example, an IPv4 subnet 192.0.2.10. For another example, an IPv6 prefix 2002:1234:4567:0000::0.

For another example, an IE whose type is route-flag in Table 7 may be an embedded IE shown in FIG. 14.

In the seventh octet, each bit indicates an attribute of a route. For example:

Bit 1 Host: If a value is 1, it indicates that a current route is a host route.

Bit 2 GW (Gateway): If a value is 1, it indicates that a current route is a gateway route.

Bit 3 Network: If a value is 1, it indicates that a current route is a subnet segment route.

Bit 4 Adv (Advertisement): If a value is 1, it indicates that a current route needs to be advertised.

Only one of Host, GW, and Network is set to 1. Adv may be combined with Host, GW, and Network.

For example, an IE whose type is tag in Table 7 may be an embedded IE shown in FIG. 15.

The tag field may be encoded as a 4-octet unsigned integer.

For example, an IE whose type is cost in Table 7 may be an embedded IE shown in FIG. 16.

The cost field may be encoded as a 4-octet unsigned integer.

An IE whose type is source IP address in Table 7 or Table 8 may be an embedded IE shown in FIG. 17.

The fifth octet is a flag field. For example:

The bit 1 V6: If a value of V6 is 1, an IPv6 address field exists. If the value of V6 is not 1, the IPv6 address field does not exist.

The bit 2 V4: If a value of V4 is 1, an IPv4 address field exists. If the value of V4 is not 1, IPv4 address field does not exist.

The bit 3 MPL: If a value of the bit is 1, a mask (for IPv4)/prefix (for IPv6) length field exists. If the value of the bit is not 1, the field does not exist.

The bits 4 to 8: reserved fields, set to 0.

The octets "m to (m+3)" and "p to (p+15)" indicate a value of the IPv4 address or the IPv6 address.

If the mask/prefix length field exists, it should be encoded as an 8-bit binary integer. For example, for an IPv4 subnet 192.0.2.10/24, an encoded value of the field is 24. For another example, for a /64 IPv6 prefix, an encoded value of the field is 64.

It can be learned that the destination IP address IE in Table 7 is constructed by reusing a source source IP address IE, to facilitate an operation. The destination IP address IE in Table 7 may also be constructed by extending a new destination IP address IE. In this manner, the destination IP address IE may be distinguished from the source IP address IE.

A structure of the first message is described based on the node-level message. It should be understood that the foregoing is only some examples, and implementation of the foregoing is not limited thereto. In some embodiments, the first message may also be constructed by using the session-level message. Compared with the node-level message, the session-level message has a header part that may only be different from that of the node-level message. FIG. 18 shows an example of a header of a session-level message.

It can be learned that in the implementation of the session-level message, a session endpoint identifier field is added. In addition, in the implementation of the session-level message, configurations of the grouped IE and the embedded IE may be similar to those in implementation of the node-level message. Details are not described herein again.

In some embodiments, the first message may be implemented based on an existing session-level message. For example, the first message may be generated based on a session establishment request message. In some embodiments, the CP device 310 may add the host route or the frame route to the session establishment request message, to generate the first message. For example, Table 16 shows an example of an IE carried in a session establishment request message. The message may also be implemented to include more additional IEs not shown or not to include some shown IEs therein.

TABLE 16

Example of an IE carried in a session establishment request message

| IE name | P | Condition/Description | IE type |
|---|---|---|---|
| Node ID | M | A device number of a CP | Node ID |
| CP F-SEID | M | An SEID of a session corresponding to a CP. A header indicates an SEID allocated to the session by a UP (if an SEID in a header of a request message is 0, the SEID allocated by the UP is returned in a response message). | F-SEID |
| Create PDR | M | Create a packet identification rule. | Create PDR |
| Create FAR | M | Create a packet forwarding rule. | Create FAR |
| — | — | —Another IE | — |
| Install route | C | An install route. A plurality of install route IEs may be carried. | Install route |

In some other embodiments, the first message may be generated based on a session deletion request message. In some embodiments, the CP device 310 may add the host route or the frame route to the session deletion request message, to generate the first message. For example, Table 17 shows an example of an IE carried in a session deletion request message. The message may also be implemented to include more additional IEs not shown or not to include some shown IEs therein.

TABLE 17

Example of an IE carried in a session deletion request message

| IE name | P | Condition/Description | IE type |
|---|---|---|---|
| Node ID | M | A device number of a CP | Node ID |
| Remove route | O | Indicate to remove a host route/frame route associated with a session. If this IE is carried, a UP needs to find and remove the host route/frame route associated with the session. | Remove route |

In some other embodiments, the first message may be generated based on a session modification request message. In some embodiments, the CP device 310 may add the host route or the frame route to the session modification request message, to generate the first message. For example, Table 18 shows an example of an IE carried in a session modification request message. The message may also be implemented to include more additional IEs not shown or not to include some shown IEs therein.

TABLE 18

Example of an IE carried in a session modification request message

| IE name | P | Condition/Description | IE type |
|---|---|---|---|
| Node ID | M | A device number of a CP | Node ID |
| — | — | —Another IE | — |
| Install route | C | An install route | Install route |
| Remove route | C | A remove route | Remove route |

Refer to FIG. 4. After generating the first message, the CP device 310 sends the first message to the UP device 320, that is, step 404 in FIG. 4. Because the first message complies with the PFCP protocol, the CP device 310 may send the first message to the UP device 320 through an SCi interface. This facilitates deployment of a vBNG architecture with CU separation. Correspondingly, the UP device 320 may receive the first message. In some embodiments, the UP device 320 may determine that the first message includes the first type information, and the UP device 320 may further obtain the control indication from the first message. This embodiment of the present disclosure is not limited thereto, and the control indication may also be obtained from the first message in another manner.

After obtaining the control indication, the UP device 320 may update the route information based on the control indication, that is, step 405 in FIG. 4. In some embodiments, the control indication may include an install indication used to indicate to install the route information, and the UP device 320 may install the route information based on the control indication. In some additional or alternative embodiments, the control indication may include a remove indication used to indicate to remove the route information, and the UP device 320 may remove the route information based on the control indication. In some embodiments of the present disclosure, updating the route information may include an operation of adding the route information. In addition, updating the route information may also include an operation of replacing the route information. For example, the operation of adding the route information may include an operation of installing the route information. The operation of replacing the route information may include an operation of deleting the original route information and adding new route information.

In some alternative embodiments, the UP device 320 may determine whether the route information includes the indication information used to indicate to advertise the route information. If the route information includes the indication information, the UP device 320 may advertise the route information, for example, to the core router or another network device connected to the UP device. For example, the route information may be advertised to the core router in this manner, and is spread to another gateway or router.

In some alternative embodiments, the UP device 320 may generate a route delivery response message (also referred to as a second message hereinafter for ease of description) as a response to the first message. This helps improve accuracy of a routing control operation. In some embodiments, the second message may include a positive response indicating that the first message is successfully received. The second message may also include a negative response indicating that the first message is unsuccessfully received. In some embodiments, the second message may further include identification information of the UP device 320. This helps the CP device 310 learn a receiving status of the first message by each UP device 320, to more accurately perform the routing control operation.

In some embodiments, the second message may further include message type information (also referred to as second type information hereinafter for ease of description) that is used to indicate that the second message includes the response, where the second message is a PFCP message. In other words, the second type information may indicate that the second message is a response to the route delivery request. In some embodiments, the second type information may be any appropriate message type value. For example, the message type value may be any appropriate decimal value shown in Table 19. It should be understood that Table 19 is merely an example, and a message type value and a name of the second message are not limited thereto, but may be any appropriate value and name.

TABLE 19

Example of an extended route delivery response message

| Message type value (decimal) | Message |
|---|---|
| 19 | PFCP route install response (PFCP route install response) |

In some embodiments, the second message may be a node-level message. In an alternative embodiment, the second message may alternatively be a session-level message. In the embodiment in which the first message is the node-level message, the UP device 320 may generate the second message as a node-level message. In the embodiment in which the first message is the session-level message, the UP device 320 may generate the second message as a session-level message. The foregoing is merely an example, and another appropriate message type known in the art or developed in the future may also be used in this embodiment of the present disclosure.

Implementation of the second message may be similar to that of the first message. Table 20 shows an example of an IE carried in the second message.

TABLE 20

Example of an IE carried in the second message

| IE name | P | Condition/Description | IE type |
|---|---|---|---|
| Node ID | M | A device number of a UP | Node ID |
| Cause | M | A processing result | Cause |

The IE type in Table 20 may also be similarly configured by using the foregoing grouped IE and embedded IE, and details are not described herein again.

After generating the second message, the UP device 320 may send the second message to the CP device 310. In some embodiments, if the second message indicates that the UP device 320 fails to receive the first message, the CP device 310 may resend the first message. This embodiment of the present disclosure is not limited to such an operation. Alternatively, the CP device 310 may continue to perform the routing control operation in any other appropriate manner based on the second message. This can improve accuracy of the routing control operation.

The routing control process according to this embodiment of the present disclosure is described herein with reference to FIG. 4. In the routing control process in this embodiment of the present disclosure, the route delivery request message is generated, so that interaction on routing control between a CP and a UP in the communication system architecture with CU separation can be implemented, to complete a route delivery operation. In addition, the message is constructed in a manner compatible with an existing protocol, to ensure compatibility with the existing protocol. This facilitates deployment of the vBNG architecture.

Figure 5:
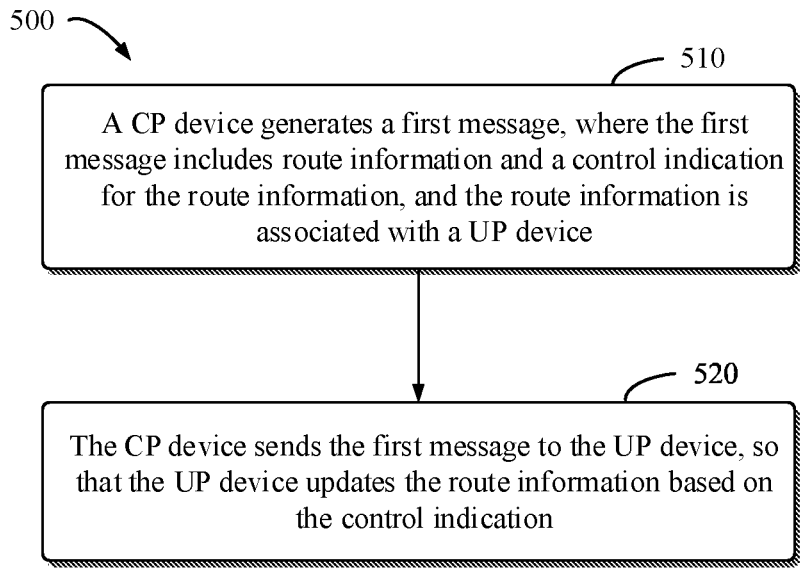
FIG. 5 shows a flowchart of a message sending method implemented by a CP device according to an embodiment of the present disclosure.

Corresponding to the foregoing routing control process, the embodiments of the present disclosure provide a message sending method implemented by a CP device and a message receiving method implemented by a UP device. FIG. 5 shows a flowchart of a message sending method 500 implemented by a CP device according to an embodiment of the present disclosure. The method 500 may be implemented by a CP device (for example, the CP device 310) in a communication system with CU separation. For ease of description, FIG. 5 is described herein with reference to the example of FIG. 3. It should be understood that the method in FIG. 5 may include other additional steps that are not shown, or may not include some shown steps. The scope of the present disclosure is not limited thereto.

As shown in FIG. 5, at 510, the CP device 310 generates a first message (for example, a route delivery request message). For example, when allocating a network segment to the UP device 320, the CP device 310 may generate the first message, to deliver a subnet segment route and a gateway route. For another example, when a frame IP and a frame route of a terminal device are authorized through AAA, after the terminal device successfully accesses, the CP device 310 may generate the first message, to deliver a host route and a frame route. This embodiment of the present disclosure is not limited to the foregoing example, and the CP device 310 may generate the first message in a timely manner according to a requirement.

In some embodiments, the first message may be a node-level message. In an alternative embodiment, the first message may alternatively be a session-level message. In some embodiments, the CP device 310 may use a same type of message for different types of route information. For example, the node-level message may be used for a network segment route, the gateway route, the host route, and the frame route. The session-level message may also be used. In some alternative embodiments, the CP device 310 may use different types of messages for different types of route information. For example, the node-level message may be used for the network segment route and the gateway route. The session-level message may be used for the host route and the frame route. The foregoing implementation is merely an example, and another appropriate message type known in the art or developed in the future may also be used in this embodiment of the present disclosure.

In this embodiment of the present disclosure, the first message includes route information associated with the UP device 320, and the first message includes a control indication for the route information. In some embodiments, the control indication may be an IE in the node-level message or the session-level message. In some embodiments, the route information may be a grouped IE in the node-level message or the session-level message.

In some embodiments, the control indication may include an install indication used to indicate to install the route information. This may implement an installing operation of the route information. Additionally or alternatively, the control indication may include a remove indication used to indicate to remove the route information. This may implement a removing operation of the route information. In these embodiments, the control indication may further include identification information of the CP device 310. This may facilitate the UP device 320 to correctly receive the first message of the CP device 310 associated with the UP device 320.

In some embodiments, the control indication may include a first control indication for first route information and a second control indication for second route information. This may control a plurality of pieces of route information, to enhance convenience of routing control. In some additional or alternative embodiments, the first control indication may include an install indication used to indicate to install the first route information, and the second control indication may include a remove indication used to indicate to remove the second route information. In this manner, different control operations may be performed on a plurality of pieces of route information, to improve flexibility of routing control.

In some embodiments, the route information may include a destination address (for example, the destination IP address in Table 7 or Table 8) and a next-hop address (for example, next-hop in Table 7 or Table 8). In some additional embodiments, the route information may further include at least one of an outbound interface index (for example, out-if-info in Table 7), a route flag (for example, route flag in Table 7), a route tag (for example, route tag in Table 7), a route cost (for example, route cost in Table 7), and a network instance (for example, the network instance in Table 7 or Table 8). In some embodiments, the outbound interface index may be used to indicate path information associated with the route information. In some embodiments, the route flag may be used to indicate a type of the route information. The type of the route information may include the network segment route, the gateway route, the host route, or the frame route. Another type of the route information is also feasible. In some embodiments, the route tag may be used to indicate an identifier of the route information, and corresponds to a route tag in a BGP. In some embodiments, the route cost may be used to indicate a cost of the route associated with the route information. In some embodiments, the network instance may correspond to a network instance in the PFCP protocol and be used to identify a VPN, for example, an L3 VPN.

In some embodiments, the at least one of the outbound interface index, the route flag, the route tag, and the network instance may be an embedded IE in the route information. For other details, refer to the foregoing examples of messages and IEs described in Table 4, Table 5, Table 7, and FIG. 10 to FIG. 15. This embodiment of the present disclosure is not limited thereto, and the route information may further include other appropriate route information or a combination of route information.

In some additional or alternative embodiments, the route information may include indication information (for example, Adv in FIG. 15), used to indicate the UP device to advertise the route information. In this way, the route information may be advertised to a core router, so that the core router can advertise the route information to another gateway or router. In some alternative embodiments, the indication information may also be implicitly determined by using a route identifier in the route flag. For example, if the route flag indicates that the route information is the network segment route or the frame route, it indicates that the route information needs to be advertised. If the route flag indicates that the route information is the gateway route or the host route, it indicates that the route information does not need to be advertised. The indication information may also be indicated in another manner, which is not limited to the example herein.

In some embodiments, the first message may further include first type information, used to indicate that the first message includes the control indication. In other words, the first type information may indicate that the first message is the route delivery request. In some embodiments, the first type information may be any appropriate message type value. For example, the message type value may be any appropriate decimal value. Reference may be made herein to the foregoing examples of message types shown in FIG. 10, FIG. 18, and Table 4. It should be understood that this is merely an example, and a message type value and a name of the first message are not limited thereto, but may be any appropriate value and name.

Refer to FIG. 5, at 520, the CP device 310 sends the first message to the UP device 320. In this manner, the UP device 320 may update the route information based on the control indication in the first message, to complete a routing control operation. In some embodiments, the CP device 310 may further receive a second message from the UP device 320. The second message includes a response of the UP device to the first message. In some embodiments, the second message may further include identification information of the UP device 320, as shown in Table 20 described above. This helps the CP device 310 learn a receiving status of the first message by each UP device 320, to more accurately perform the routing control operation.

In some embodiments, the second message may further include second type information, used to indicate that the second message includes the response. In other words, the second type information may indicate that the second message is a response to the route delivery request. In some embodiments, the second type information may be any appropriate message type value. For example, the message type value may be any appropriate decimal value shown in Table 19. It should be understood that this is merely an example, and a message type value and a name of the second message are not limited thereto, but may be any appropriate value and name. In some embodiments, the second message may be a node-level message. In an alternative embodiment, the second message may alternatively be a session-level message. In these embodiments, the second message and the first message are of a same message type.

The processing described above in FIG. 5 corresponds to operations in 402 to 404 in FIG. 4. For other details, refer to related descriptions in FIG. 4. Details are not described herein again. According to the routing control method in FIG. 5, a route delivery operation in a communication system architecture with CU separation may be completed.

Figure 6:
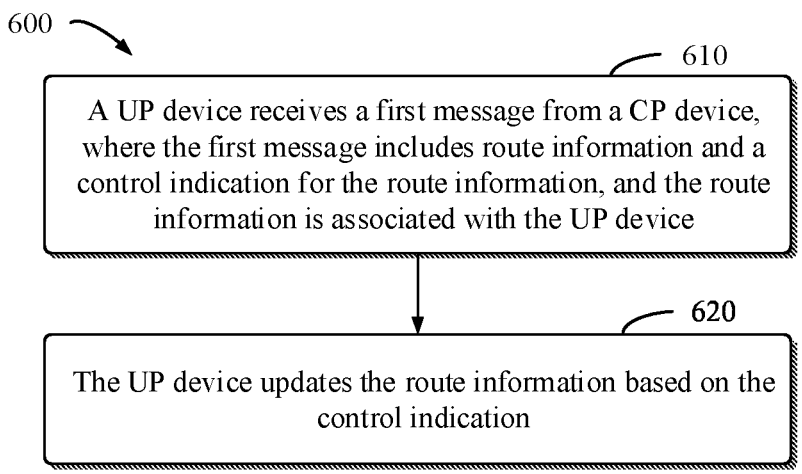
FIG. 6 shows a flowchart of a message receiving method implemented by a UP device according to an embodiment of the present disclosure.

Correspondingly, the embodiments of the present disclosure further provide a routing control method implemented by a UP device. FIG. 6 shows a flowchart of a routing control method 600 implemented by a UP device according to an embodiment of the present disclosure. The method 600 may be implemented by a UP device (for example, the UP device 320) in a communication system architecture with CU separation. For ease of description, FIG. 6 will be described herein with reference to the example of FIG. 3. It should be understood that the method in FIG. 6 may include other additional steps that are not shown, or may not include some shown steps. The scope of the present disclosure is not limited thereto.

As shown in FIG. 6, at 610, the UP device 320 receives a first message from the CP device 310. The first message includes route information associated with the UP device 320, and the first message includes a control indication for the route information. In some embodiments, the control indication may include an install indication used to indicate to install the route information. In additional or alternative embodiments, the control indication may include a remove indication used to indicate to remove the information. In these embodiments, the control indication may further include identification information of the CP device 310. In this manner, the UP device 320 may complete a route updating operation.

In some embodiments, the first message may be a node-level message. Alternatively, the first message may be a session-level message. In some embodiments, the route information may be a grouped IE in the node-level message or the session-level message.

In some embodiments, the route information may include a destination address (for example, destination IP address in Table 7 or Table 8) and a next-hop address (for example, next-hop in Table 7 or Table 8). In additional or alternative embodiments, the route information may further include at least one of an outbound interface index (for example, out-if-info in Table 7), a route flag (for example, route-flag in Table 7), a route tag (for example, route-tag in Table 7), a route cost (for example, route-cost in Table 7), and a network instance (for example, network instance in Table 7 or Table 8).

In some embodiments, the UP device 320 may determine that the first message includes first type information, and obtain the control indication from the first message. The control indication may also be obtained in another manner.

After obtaining the control indication, at 620, the UP device 320 updates the route information based on the control indication. In embodiments in which the control indication includes an install indication used to indicate to install the route information, the UP device 320 may install the route information based on the install indication. In embodiments in which the control indication includes a remove indication used to indicate to remove the route information, the UP device 320 may remove the corresponding route information based on the remove indication. It should be noted that the control indication may include both an install indication and a remove indication for different route information. In this manner, the UP device 320 may complete the route updating operation.

In some additional or alternative embodiments, the UP device 320 may further determine whether the route information includes indication information, and when determining that the route information includes the indication information, advertise the route information to a core router. In this manner, the route information is advertised, so that the core router can learn route information to an address managed by the UP device 320. Further, the core router may advertise the route to another gateway or router.

In some additional or alternative embodiments, the UP device 320 may further generate a second message (for example, a route delivery response message), where the second message includes a response to the first message. The UP device 320 may send the second message to the CP device 310, to more accurately complete the routing control operation. For example, the response may be a positive response indicating that the first message is successfully received. For another example, the response may be a negative response indicating that the first message is unsuccessfully received. In some embodiments, the second message may further include identification information of the UP device 320. In this manner, the CP device 310 may learn a receiving status of the first message by the UP device 320.

In some embodiments, the second message may further include second type information, used to indicate that the second message includes the response. In this manner, the CP device 310 can correctly receive the first message. In some embodiments, the second message may be a node-level message, or may be a session-level message. In the embodiment in which the first message is the node-level message, the UP device 320 may generate the second message as the node-level message. In the embodiment in which the first message is the session-level message, the UP device 320 may generate the second message as the session-level message. The foregoing is merely an example, and another appropriate message type known in the art or developed in the future may also be used in this embodiment of the present disclosure.

The processing described above in FIG. 6 corresponds to operations in 405 to 407 in FIG. 4. For other details, refer to related descriptions in FIG. 4. Details are not described herein again. According to the routing control method in FIG. 6, a route updating operation in the communication system architecture with CU separation may be completed.

In conclusion, according to the solutions in this embodiment of the present disclosure, a PFCP message used for a route delivery operation is extended, so that interaction on routing control between a CP and a UP in the communication system architecture with CU separation can be implemented. In addition, compatibility with an existing protocol can be implemented, and this facilitates deployment of a communication system architecture with CU separation.

Figure 7:
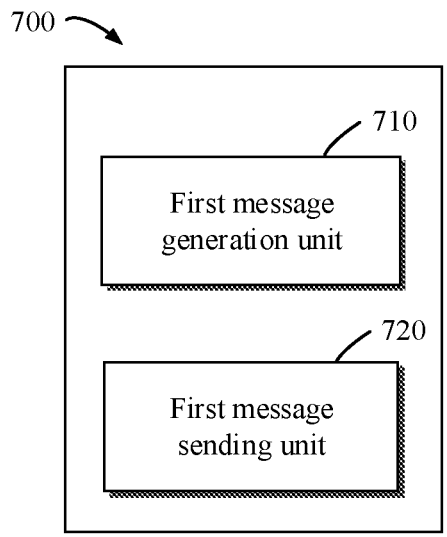
FIG. 7 shows a schematic block diagram of a message sending apparatus according to an embodiment of the present disclosure.

Corresponding to the foregoing methods, the embodiments of the present disclosure further provide message sending and receiving apparatuses and devices, which are described below with reference to FIG. 7 to FIG. 9. FIG. 7 shows a schematic block diagram of a message sending apparatus 700 according to the embodiments of the present disclosure shown in FIG. 4 to FIG. 6. The apparatus 700 may be implemented by a CP device (for example, the CP device 310 in FIG. 3) in a communication system architecture with CU separation. For ease of description, FIG. 7 is described below with reference to an example in FIG. 3. The apparatus 700 may be a part of the CP device 310, or may be the CP device 310 itself. It should be understood that the apparatus 700 may include more additional components than the shown components, or may not include some components shown in the apparatus 700. This is not limited in this embodiment of the present disclosure.

As shown in FIG. 7, the apparatus 700 may include a first message generation unit 710 and a first message sending unit 720. The first message generation unit 710 may be configured to generate a first message, where the first message includes route information and a control indication for the route information, and the route information is associated with the UP device 320. The first message generation unit 710 may perform step 403 shown in FIG. 4 or step 510 shown in FIG. 5. The first message sending unit 720 may be configured to send the first message to the UP device 320, so that the UP device 320 updates the route information based on the control indication. In some embodiments, the first message is a PFCP message. The first message sending unit 720 may perform step 404 shown in FIG. 4 or step 520 shown in FIG. 5.

In some embodiments, the route information may be a grouped IE in a node-level message or a session-level message. In some embodiments, the control indication may include at least one of an install indication and a remove indication. The install indication is used to indicate to install the route information, and the remove indication is used to indicate to remove the route information.

In some embodiments, the route information may include a destination address and a next-hop address. In some additional or alternative embodiments, the route information may further include at least one of the following: an outbound interface index, a route flag, a route tag, a route cost, and a network instance. The outbound interface index is used to indicate path information associated with the route information. The route flag is used to indicate a type of the route information. The type of the route information may include at least one of a network segment route, a gateway route, a host route, and a frame route. In some embodiments, the route tag may be used to indicate an identifier of the route information, and corresponds to a route tag in a BGP. The route cost is used to indicate a cost of a route associated with the route information. The network instance corresponds to a network instance in the PFCP protocol, and is used to identify a VPN, for example, an L3 VPN. In some embodiments, the at least one of the outbound interface index, the route flag, the route tag, and the network instance may be an embedded IE in the route information.

In some additional or alternative embodiments, the route information may include indication information, used to indicate the UP device 320 to advertise the route information. In some additional or alternative embodiments, the first message may further include first type information, used to indicate that the first message includes the control indication.

In some embodiments, the route information may include first route information and second route information, and the control indication may include a first control indication for the first route information and a second control indication for the second route information. In some additional or alternative embodiments, the first control indication may be used to indicate to install or remove the first route information, and the second control indication may be used to indicate to install or remove the second route information.

In some embodiments, the apparatus 700 may further include a second message receiving unit (not shown). The second message receiving unit may be configured to receive a second message from the UP device 320, where the second message includes a response of the UP device 320 to the first message. In some embodiments, the second message may be a node-level message or a session-level message. In some additional or alternative embodiments, the second message further includes identification information of the UP device 320. In some additional or alternative embodiments, the second message may further include second type information, where the second type information indicates that the second message includes the response. In some embodiments, the session-level message may include one of a session establishment request message, a session deletion request message, and a session modification request message.

Figure 8:
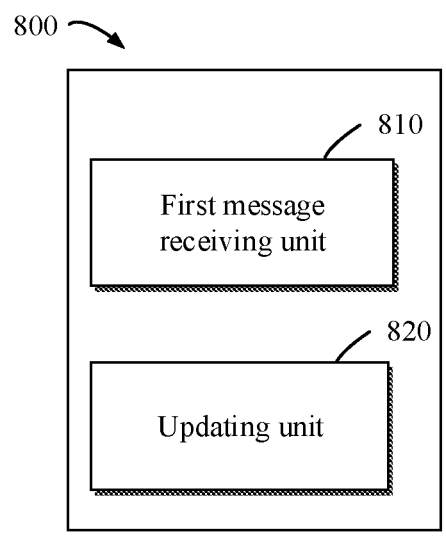
FIG. 8 shows a schematic block diagram of a message receiving apparatus according to an embodiment of the present disclosure.

FIG. 8 shows a schematic block diagram of a message receiving apparatus 800 according to the embodiments of the present disclosure shown in FIG. 4 to FIG. 6. The apparatus 800 may be implemented by a UP device (for example, any UP device 320 in the UP devices 320-1, 320-2, 320-3 in FIG. 3) in a communication system architecture with CU separation. For ease of description, FIG. 8 is described below with reference to an example in FIG. 3. The apparatus 800 may be a part of the UP device 320, or may be the UP device 320 itself. It should be understood that the apparatus 800 may include more additional components than the shown components, or may not include some components shown in the apparatus 800. This is not limited in this embodiment of the present disclosure.

As shown in FIG. 8, the apparatus 800 may include a first message receiving unit 810 and an updating unit 820. The first message receiving unit 810 may be configured to receive a first message from the CP device 310. The first message includes route information and a control indication for the route information, and the route information is associated with the UP device 320. The first message receiving unit 810 may perform step 404 shown in FIG. 4 or step 610 shown in FIG. 6. The updating unit 820 may be configured to update the route information based on the control indication. In some embodiments, the first message is a PFCP message. The updating unit 802 may perform step 405 shown in FIG. 4 or step 620 shown in FIG. 6.

In some embodiments, the first message receiving unit 810 may include an obtaining unit (not shown), configured to obtain the control indication from the first message.

In some embodiments, the updating unit 820 may include: an installation unit (not shown), configured to install the route information when it is determined that the control indication includes an install indication used to indicate to install the route information; and a removing unit (not shown), configured to remove the route information if it is determined that the control indication includes a remove indication used to indicate to remove the route information.

In some additional embodiments, the apparatus 800 may further include an advertising unit (not shown), configured to advertise the route information to a core router based on indication information.

In some additional embodiments, the apparatus 800 may further include: a second message generation unit (not shown), configured to generate a second message, where the second message includes a response to the first message; and a second message sending unit (not shown), configured to send a second message to the CP device 310. In some embodiments, the second message may further include second type information, where the second type information indicates that the second message includes the response.

FIG. 9 is a simplified block diagram of a device 900 applicable to implementing an embodiment of the present disclosure. The device 900 may be provided to implement an electronic device, for example, any one of the CP device 310 and the UP device 320 shown in FIG. 3. As shown in FIG. 9, the device 900 includes one or more processors 910, one or more memories 920 coupled to the processor 910, and one or more communication modules 940 coupled to the processor 910.

The communication module 940 is used for bidirectional communication. The communication module 940 has a communication interface to facilitate communication. The communication interface may represent any interface necessary to communicate with another network element.

The processor 910 may be any type of processor applicable to a local technology network, and may include, by way of example and not limitation, one or more of the following: a general-purpose computer, a dedicated computer, a microprocessor, a digital signal processor, and a processor based on a multi-core processor architecture. The device 900 may have a plurality of processors, for example, application-specific integrated circuit chips that follow a clock synchronized with a main processor in time.

The memory 920 may include one or more non-volatile memories and one or more volatile memories. The non-volatile memory includes, by way of example and not limitation, a read-only memory (ROM) 924, an electrically programmable read-only memory (EPROM), a flash memory, a hard disk, a compact disc (CD), a digital video disc (DVD), and another magnetic and/or optical storage apparatus. The volatile memory includes, by way of example and not limitation, a random access memory (RAM) 922 and another volatile memory that does not maintain stored information while powered-off.

A computer program 930 includes computer-executable instructions executed by an associated processor 910. The program 930 may be stored in the ROM 920. The processor 910 may perform any appropriate action and processing by loading the program 930 into the RAM 920.

This embodiment of the present disclosure may be implemented by using the program 930, so that the device 900 performs the processing of the present disclosure as discussed in FIG. 4 to FIG. 6.

In a specific embodiment, the processor in the network device 900 is configured to: generate a first message, where the first message includes route information and a control indication for the route information, and the route information is associated with the UP device; and send the first message to the UP device through the communication interface, so that the UP device updates the route information based on the control indication, where the first message is a packet forwarding control protocol PFCP message. For a detailed processing process of the processor, refer to detailed description of the processes 403 and 404 in the embodiment shown in FIG. 4 and the processes 510 and 520 in the embodiment shown in FIG. 5. Details are not described herein again.

In a specific embodiment, the processor in the network device 900 is configured to: receive a first message from the CP device through the communication interface, where the first message includes route information and a control indication for the route information, and the route information is associated with the UP device; and update the route information based on the control indication, where the first message is a packet forwarding control protocol PFCP message. For a detailed processing process of the processor, refer to detailed description of the processes 404 and 405 in the embodiment shown in FIG. 4 and the processes 610 and 620 in the embodiment shown in FIG. 6. Details are not described herein again.

The device 900 may correspond to the message sending apparatus 700 or the message receiving apparatus 800, and each functional module in the apparatus 700 or the apparatus 800 is implemented by using software of the device 900. In other words, a functional module included in the apparatus 700 or the apparatus 800 is generated after the processor 910 of the device 900 reads program code stored in the memory 920. This embodiment of the present disclosure may further be implemented by hardware or by a combination of software and hardware.

In some embodiments, the program 930 may be tangibly contained in a computer-readable medium, and the computer-readable medium may be included in the device 900 (for example, in the memory 920) or another storage device that may be accessed by the device 900. The program 930 may be loaded from the computer-readable medium to the RAM 922 for execution. The computer-readable medium may include any type of tangible non-volatile memory, for example, a ROM, an EPROM, a flash memory, a hard disk, a CD, a DVD, and the like.

Generally, various example embodiments of the present disclosure may be implemented by hardware or a dedicated circuit, software, logic, or any combination thereof. Some aspects may be implemented in hardware, while another aspect may be implemented in firmware or software that may be executed by a controller, a microprocessor, or another computing device. When aspects of the embodiments of the present disclosure are illustrated or described as block diagrams, flowcharts, or represented by using some other graphical representation, it will be understood that the blocks, apparatuses, systems, techniques, or methods described herein may be implemented as non-limiting examples in hardware, software, firmware, dedicated circuits or logic, general-purpose hardware or controllers, or other computing devices, or some combinations thereof. A hardware device that may be used to implement the embodiments of the present disclosure includes, by way of example and not limitation, a field programmable gate array (FPGA), an application-specific integrated circuit (ASIC), an application-specific standard product (ASSP), a system-on-a-chip (SOC), a complex programmable logic device (CPLD), and the like.

For example, the embodiments of the present disclosure may be described in context of machine-executable instructions, and the machine-executable instructions are, for example, program modules executed in a device included in a target real or virtual processor. Generally, the program modules include routines, programs, libraries, objects, classes, components, data structures, and the like that perform specific tasks or implement specific abstract data structures. In various embodiments, functions of the program modules may be combined or divided between the described program modules. The machine-executable instructions used for the program modules may be executed within a local or distributed device. In a distributed device, the program module may be located in both local and remote storage media.

Computer program code for implementing the methods of the present disclosure may be compiled in one or more programming languages. The computer program code may be provided for a processor of a general-purpose computer, a dedicated computer, or another programmable data processing apparatus, so that when the program code is executed by the computer or the another programmable data processing apparatus, functions/operations specified in the flowcharts and/or block diagrams are performed. The program code may be executed entirely on a computer, partly on a computer, as a separate software package, partly on a computer and partly on a remote computer, or entirely on a remote computer or server.

In context of the present disclosure, the computer program code or related data may be carried by any appropriate carrier to enable a device, apparatus, or processor to perform various processes and operations described above. An example of the carrier includes a signal, a computer-readable medium, and the like.

An example of the signal may include an electrical, optical, radio, sound, or other forms of propagating signal, for example, a carrier wave, an infrared signal, and the like.

A machine-readable medium may be any tangible medium containing or storing a program used for or relating to an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination thereof. More detailed examples of the machine-readable storage media include an electrical connection with one or more wires, a portable computer disk, a hard disk, a random access memory (RAM), a read-only memory (ROM), an erasable programmable read-only memory (EPROM or flash memory), an optical storage device, a magnetic storage device, or any appropriate combination thereof.

In addition, although operations are described in a particular order, this should not be understood as requiring such operations to be completed in the particular order shown or in a sequential order, or to perform all of the shown operations to obtain the desired result. In some cases, multitasking or parallel processing can be beneficial. Similarly, while the above discussion includes specific implementation details, this should not be construed as limiting the scope of any invention or claim, but rather as a description of particular embodiments that may be directed to a particular invention. Some features described in this specification in context of separate embodiments may also be incorporated into a single embodiment. Conversely, various features described in context of a single embodiment may also be implemented separately in a plurality of embodiments or in any appropriate sub-combination.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A control plane (CP) device in a communication system in which a CP and a user plane (UP) are separated, comprising:
   at least one processor;
   one or more memories coupled to the at least one processor and storing programming instructions, wherein the at least one processor is configured to execute the programming instructions to cause the CP device to:
   generate a first message, wherein the first message comprises route information; and
   send the first message to a UP device in the communication system, the first message configured to indicate the UP device to update the route information, wherein
   the first message is a packet forwarding control protocol (PFCP) message; and
   wherein the route information comprises at least one of the following: an outbound interface index, a route type, a route tag, a route cost, or a network instance, wherein
   the outbound interface index indicates path information associated with the route information;
   the route type corresponds to a type of the route information, and the type of the route information is a frame route;
   the route tag indicates an identifier of the route information;
   the route cost indicates a cost of a route associated with the route information; and
   the network instance identifies a virtual private network, and the network instance corresponds to a network instance in a PFCP protocol.

2. The device according to claim 1, wherein the first message is a node-level message or a session-level message.

3. The device according to claim 2, wherein the route information is a grouped information element in the first message.

4. The device according to claim 1, wherein the first message further comprises a control indication, the control indication comprises at least one of an install indication or a remove indication, the install indication indicates the UP device to install the route information, and the remove indication indicates the UP to remove the route information.

5. The device according to claim 4, wherein the route information comprises a destination address and a next-hop address.

6. The device according to claim 1, wherein the CP device is in a virtual broadband network gateway (vBNG) system.

7. The device according to claim 1, wherein at least one of the outbound interface index, the route flag, the route tag, the route cost, or the network instance is an embedded information element in the route information.

8. The device according to claim 1, wherein the route information comprises indication information, and the indication information indicates the UP device to advertise the route information.

9. The device according to claim 1, wherein the first message further comprises first type information, and the first type information indicates that the first message comprises the control indication.

10. The device according to claim 1, wherein the route information comprises first route information and second route information.

11. The device according to claim 10, wherein the first message further comprises a control indication, the control indication comprises a first control indication for the first route information and a second control indication for the second route information, the first control indication indicates the UP device to install or remove the first route information, and the second control indication indicates the UP device to install or remove the second route information.

12. The device according to claim 1, wherein the at least one processor is further configured to execute the programming instructions to cause the CP device to:
receive a second message from the UP device, wherein the second message comprises a response of the UP device to the first message.

13. The device according to claim 12, wherein the second message is a node-level message or a session-level message.

14. The device according to claim 12, wherein the second message further comprises identification information of the UP device.

15. The device according to claim 12, wherein the second message further comprises second type information, and the second type information indicates that the second message comprises the response.

16. The device according to claim 2, wherein the session-level message comprises one of a session establishment request message, a session deletion request message, or a session modification request message.

17. A user plane (UP) device in a communication system in which a control plane (CP) and a UP are separated, comprising:
at least one processor;
one or more memories coupled to the at least one processor and storing programming instructions, wherein the at least one processor is configured to execute the programming instructions to cause the UP device to:
receive a first message from a CP device in the communication system, wherein the first message comprises route information; and
update the route information, wherein
the first message is a packet forwarding control protocol (PFCP) message; and
wherein the route information comprises at least one of the following: an outbound interface index, a route type, a route tag, a route cost, or a network instance, wherein
the outbound interface index indicates path information associated with the route information;
the route type corresponds to a type of the route information, and the type of the route information is a frame route;
the route tag indicates an identifier of the route information;
the route cost indicates a cost of a route associated with the route information; and
the network instance identifies a virtual private network, and the network instance corresponds to a network instance in a PFCP protocol.

18. The device according to claim 17, wherein the first message comprises first type information, the first type information indicates that the first message comprises the control indication, and the at least one processor is further configured to execute the programming instructions to cause the UP device to:
obtain the control indication from the first message based on the first type information.

19. The device according to claim 17, wherein the first message further comprises a control indication, the at least one processor is further configured to execute the programming instructions to cause the UP device to:
install the route information based on the control indication; or
remove the route information based on the control indication.

20. The device according to claim 17, wherein the route information comprises indication information, the indication information indicates the UP device to advertise the route information, and the at least one processor is further configured to execute the programming instructions to cause the UP device to:
advertise the route information based on the indication information.

21. The device according to claim 17, wherein the at least one processor is further configured to execute the programming instructions to cause the UP device to:
generate a second message, wherein the second message comprises a response to the first message; and
send the second message to the CP device.

22. The device according to claim 21, wherein the second message further comprises second type information, and the second type information indicates that the second message comprises the response.

23. A message sending method, wherein the method is applied to a control plane (CP) device in a communication system in which a CP and a user plane (UP) are separated, and the method comprises:
generating, by the CP device, a first message, wherein the first message comprises route information; and
sending, by the CP device, the first message to a UP device in the communication system, the first message configured to indicate the UP device to update the route information, wherein
the first message is a packet forwarding control protocol (PFCP) message; and
wherein the route information comprises at least one of the following: an outbound interface index, a route type, a route tag, a route cost, or a network instance, wherein
the outbound interface index indicates path information associated with the route information;
the route type corresponds to a type of the route information, and the type of the route information is a frame route;
the route tag indicates an identifier of the route information;

the route cost indicates a cost of a route associated with the route information; and the network instance identifies a virtual private network, and the network instance corresponds to a network instance in a PFCP protocol.

24. A message receiving method, wherein the method is applied to a user plane (UP) device in a communication system in which a UP and a control plane (CP) are separated, and the method comprises:
  receiving, by the UP device, a first message from a CP device in the communication system, wherein the first message comprises route information; and
  updating, by the UP device, the route information, wherein
  the first message is a packet forwarding control protocol (PFCP) message; and
  wherein the route information comprises at least one of the following: an outbound interface index, a route type, a route tag, a route cost, or a network instance, wherein
  the outbound interface index indicates path information associated with the route information;
  the route type corresponds to a type of the route information, and the type of the route information is a frame route;
  the route tag indicates an identifier of the route information;
  the route cost indicates a cost of a route associated with the route information; and
  the network instance identifies a virtual private network, and the network instance corresponds to a network instance in a PFCP protocol.

25. A communication system in which a control plane (CP) and a user plane (UP) are separated, wherein the system comprises
  a CP device and a UP device;
  wherein the CP device is configured to:
  generate a first message, wherein the first message comprises route information; and
  send the first message to the UP device;
  wherein the UP device is configured to:
  update the route information, wherein
  the first message is a packet forwarding control protocol (PFCP) message; and
  wherein the route information comprises at least one of the following: an outbound interface index, a route type, a route tag, a route cost, or a network instance, wherein
  the outbound interface index indicates path information associated with the route information;
  the route type corresponds to a type of the route information, and the type of the route information is a frame route;
  the route tag indicates an identifier of the route information;
  the route cost indicates a cost of a route associated with the route information; and
  the network instance identifies a virtual private network, and the network instance corresponds to a network instance in a PFCP protocol.

26. The system according to claim 25, wherein the first message is a node-level message or a session-level message.

27. The system according to claim 26, wherein the route information is a grouped information element in the first message.

28. The system according to claim 25, wherein the first message further comprises a control indication, the control indication comprises at least one of an install indication or a remove indication, the install indication indicates the UP device to install the route information, and the remove indication indicates the UP to remove the route information.

29. The system according to claim 28, wherein the route information comprises a destination address and a next-hop address.

30. The system according to claim 25, wherein the communication system is a virtual broadband network gateway (vBNG) system.

31. The system according to claim 25, wherein at least one of the outbound interface index, the route flag, the route tag, the route cost, or the network instance is an embedded information element in the route information.

32. The system according to claim 25, wherein the route information comprises indication information, and the indication information indicates the UP device to advertise the route information.

33. The system according to claim 25, wherein the first message further comprises first type information, and the first type information indicates that the first message comprises the control indication.

34. The system according to claim 25, wherein the route information comprises first route information and second route information.

35. The system according to claim 34, wherein the first message further comprises a control indication, the control indication comprises a first control indication for the first route information and a second control indication for the second route information, the first control indication indicates the UP device to install or remove the first route information, and the second control indication indicates the UP device to install or remove the second route information.

36. The system according to claim 25, wherein the CP device is further configured to:
  receive a second message from the UP device, wherein the second message comprises a response of the UP device to the first message.

37. The system according to claim 36, wherein the second message is a node-level message or a session-level message.

38. The system according to claim 36, wherein the second message further comprises identification information of the UP device.

39. The system according to claim 36, wherein the second message further comprises second type information, and the second type information indicates that the second message comprises the response.

40. The device according to claim 17, wherein the UP device is in a virtual broadband network gateway (vBNG) system.

* * * * *